United States Patent
Chapman et al.

(10) Patent No.: US 9,566,739 B2
(45) Date of Patent: Feb. 14, 2017

(54) COMPOSITE FILLER

(71) Applicant: The Boeing Company, Chicago, IL (US)

(72) Inventors: Michael R. Chapman, Federal Way, WA (US); Khanh Mai Pham, Kent, WA (US); Derek Paul Vetter, Olympia, WA (US)

(73) Assignee: THE BOEING COMPANY, Chicago, IL (US)

( * ) Notice: Subject to any disclaimer, the term of this patent is extended or adjusted under 35 U.S.C. 154(b) by 163 days.

(21) Appl. No.: 14/182,474

(22) Filed: Feb. 18, 2014

(65) Prior Publication Data
US 2015/0231848 A1 Aug. 20, 2015

(51) Int. Cl.
*B29C 70/30* (2006.01)
*B32B 1/00* (2006.01)
*B29C 53/04* (2006.01)
*B32B 38/00* (2006.01)

(52) U.S. Cl.
CPC ............ *B29C 53/04* (2013.01); *B29C 70/30* (2013.01); *B32B 1/00* (2013.01); *B32B 38/0012* (2013.01); *Y10T 156/1031* (2015.01); *Y10T 428/24628* (2015.01)

(58) Field of Classification Search
CPC .................................. B29C 53/04; B29C 70/30
USPC ........ 264/258, 263, 267, 308, 339; 156/212, 156/214
See application file for complete search history.

(56) References Cited

U.S. PATENT DOCUMENTS

| | | | |
|---|---|---|---|
| 4,113,910 A | 9/1978 | Loyd | |
| 4,167,430 A | 9/1979 | Arachi | |
| 4,331,723 A | 5/1982 | Hamm | |
| 4,559,005 A | 12/1985 | Gants et al. | |
| 4,778,545 A | 10/1988 | Von Derau et al. | |
| 4,789,594 A | 12/1988 | Stawski | |
| 4,913,910 A | 4/1990 | McCarville et al. | |
| 4,936,525 A | 6/1990 | Daffix et al. | |
| 4,988,278 A * | 1/1991 | Mills ................. | B29C 70/526 156/441 |
| 5,639,535 A * | 6/1997 | McCarville ............. | B29C 70/30 156/182 |
| 5,843,355 A * | 12/1998 | McCarville ........... | B29C 70/345 156/197 |
| 5,919,543 A | 7/1999 | McCarville et al. | |
| 6,106,646 A | 8/2000 | Fairbanks | |

(Continued)

FOREIGN PATENT DOCUMENTS

| | | | |
|---|---|---|---|
| EP | 2018950 A1 | 1/2009 | |
| GB | EP 0396281 A2 * | 11/1990 | ............. B29B 15/08 |

(Continued)

OTHER PUBLICATIONS

Extended European Search Report, dated Dec. 1, 2015, regarding Application No. EP15153225.6, 7 pages.

(Continued)

*Primary Examiner* — Atul P. Khare
(74) *Attorney, Agent, or Firm* — Yee & Associates, P.C.

(57) ABSTRACT

A method and apparatus is presented. Layers of composite material are laid down on a forming tool. A respective bend is formed in each of the layers to form the composite filler comprising bent layers on the forming tool. The composite filler comprising the bent layers is placed into a gap formed by at least one composite structure.

9 Claims, 14 Drawing Sheets

(56) References Cited

U.S. PATENT DOCUMENTS

| | | | |
|---|---|---|---|
| 6,231,941 B1 | 5/2001 | Cundiff et al. | |
| 6,562,436 B2* | 5/2003 | George | B32B 5/12 |
| | | | 428/105 |
| 6,689,448 B2 | 2/2004 | George et al. | |
| 6,709,538 B2 | 3/2004 | George et al. | |
| 7,871,553 B2* | 1/2011 | Wilkerson | B29C 70/52 |
| | | | 264/285 |
| 8,465,613 B2 | 6/2013 | Rotter et al. | |
| 8,491,745 B2* | 7/2013 | Wilkerson | B29C 43/22 |
| | | | 156/201 |
| 8,540,833 B2 | 9/2013 | Deobald et al. | |
| 8,591,685 B2 | 11/2013 | Anderson et al. | |
| 9,370,921 B2* | 6/2016 | Butler | B64C 3/182 |
| 2009/0057487 A1 | 3/2009 | Velicki et al. | |
| 2010/0024966 A1* | 2/2010 | Felip | B29C 53/265 |
| | | | 156/196 |
| 2011/0039057 A1 | 2/2011 | Frisch et al. | |
| 2011/0121479 A1* | 5/2011 | Lengsfeld | B29C 70/52 |
| | | | 264/70 |
| 2013/0062808 A1 | 3/2013 | Bremmer et al. | |
| 2013/0134621 A1* | 5/2013 | Tsotsis | B29B 11/16 |
| | | | 264/177.2 |
| 2013/0309443 A1 | 11/2013 | Deobald et al. | |
| 2015/0231849 A1 | 8/2015 | Chapman et al. | |

FOREIGN PATENT DOCUMENTS

| | | | | |
|---|---|---|---|---|
| GB | 2244453 A | * | 12/1991 | B29C 53/04 |
| JP | H08165363 A | | 6/1996 | |
| JP | 2000178855 A | | 6/2000 | |

OTHER PUBLICATIONS

Chapman et al., "Composite Filler," U.S. Appl. No. 14/448,051, filed Jul. 31, 2014, 58 pages.

Office Action, dated Sep. 14, 2016, regarding U.S. Appl. No. 14/448,051, 18 pages.

* cited by examiner

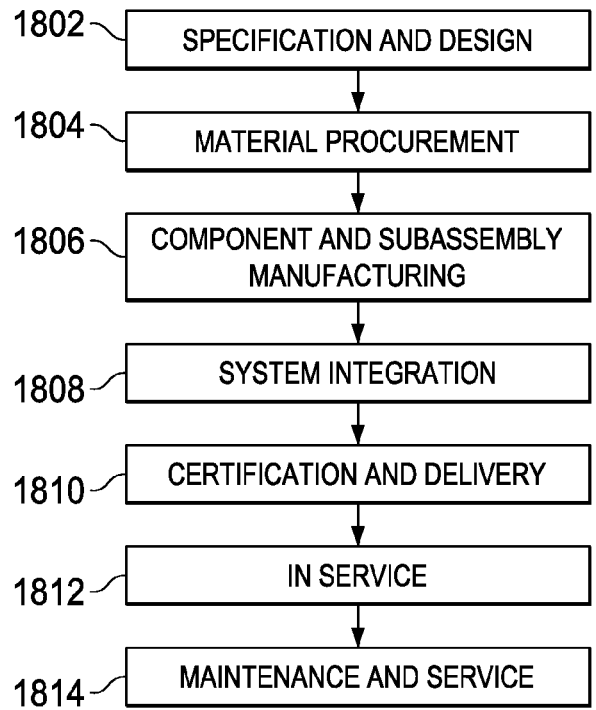
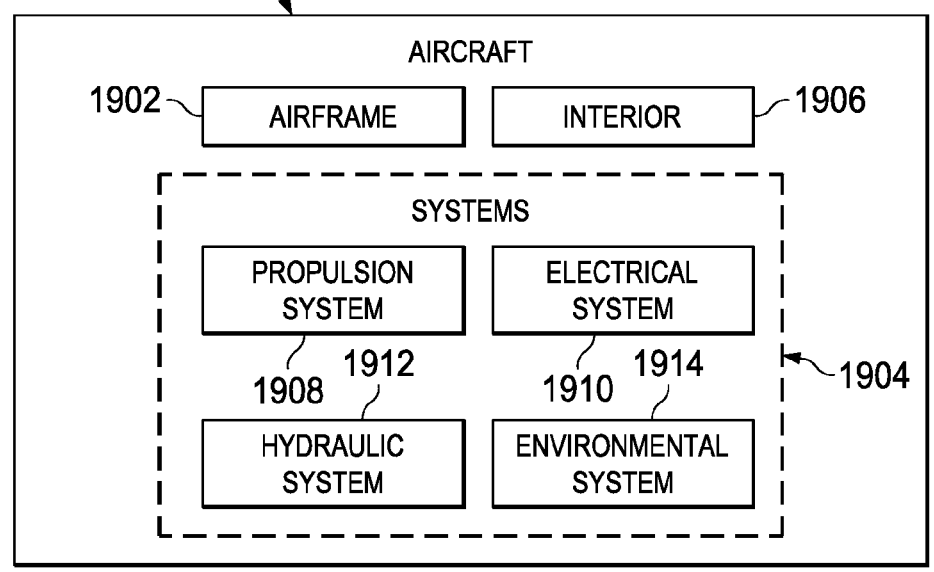

COMPOSITE FILLER

BACKGROUND INFORMATION

1. Field

The present disclosure generally relates to composite structures and, in particular, to the fabrication of composite structures. Still more particularly, the present disclosure relates to a method and apparatus for producing composite fillers used to fill gaps in composite structures.

2. Background

Composite materials are tough, lightweight materials created by combining two or more functional components. For example, a composite material may include reinforcing fibers bound in polymer resin matrix. The fibers may be unidirectional or may take the form of a woven cloth or fabric. In thermoset composites, fibers and resins are arranged and cured to form a composite material.

When composite structural members are joined together, gaps or voids may be present along bond lines between the members which may need to be filled in order to increase the strength of the bond. For example, in the aircraft industry, composite fuselage stiffeners such as stringers may include adhesive filler at the radius bond line between the stringer and a fuselage skin. The adhesive filler is applied in the form of triangular cross section strips, sometimes referred to as noodles or fillers, which fill the voids at the bond line. The adhesive filler may be formed from composite materials such as adhesive, prepreg tape or fabric.

When a stiffener possesses sufficient pull-off strength in the area of the filler, the stiffener resists tension loads imposed on the stiffener for a given application. In order to achieve adequate pull-off strength, it may be necessary to increase the gauge of the stiffener, thereby adding weight to the aircraft. Alternatively, radius blocks may be added to the stiffeners in order to increase pull-off strength, but the radius blocks may add undesirable weight, complexity, or cost to the aircraft.

The filler may be formed by extruded material, rolled composite material, or stacked strips of composite material parallel to the aircraft skin. When the filler is of sufficient stiffness, the filler may transfer some of the load from the stiffener into the base. If the filler is not sufficiently strong it may not function to transfer load.

Therefore, it would be desirable to have a method and apparatus that take into account at least some of the issues discussed above, as well as other possible issues.

SUMMARY

An illustrative embodiment of the present disclosure provides a method of forming a composite filler. Layers of composite material are laid down on a forming tool. A respective bend is formed in each of the layers to form the composite filler comprising bent layers on the forming tool. The composite filler comprising the bent layers is placed into a gap formed by at least one composite structure.

Another illustrative embodiment of the present disclosure provides a composite filler. The composite filler comprises a first layer having a first bent shape and a second layer having a second bent shape.

Yet another illustrative embodiment of the present disclosure provides a composite filler. The composite filler comprises a plurality of composite layers, each composite layer having a respective bent shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 18 is an illustration of a block diagram of an aircraft manufacturing and service method in accordance with an illustrative embodiment; and FIG. 19 is an illustration of a block diagram of an aircraft in which an illustrative embodiment may be implemented.

DETAILED DESCRIPTION

The illustrative embodiments recognize and take into account one or more different considerations. The illustrative embodiments recognize and take into account that plies following a radius may direct a load along the radius. Accordingly, the illustrative embodiments recognize and take into account that forming a filler of plies following a radius of a stiffener may direct a load along the radius rather than into the filler. Thus, the illustrative embodiments recognize and take into account that forming a filler following a radius of a stiffener may increase the pull-off strength of the filler.

The illustrative examples further recognize and take into account that forming a filler following a radius of a stiffener may have additional advantages. Specifically, the illustrative examples take into account that a filler may have advantageous thermal behavior at least one of during or following the cure cycle when the filler material is comprised of a similar shape and form of the material of the composite structural members.

Figure 1:
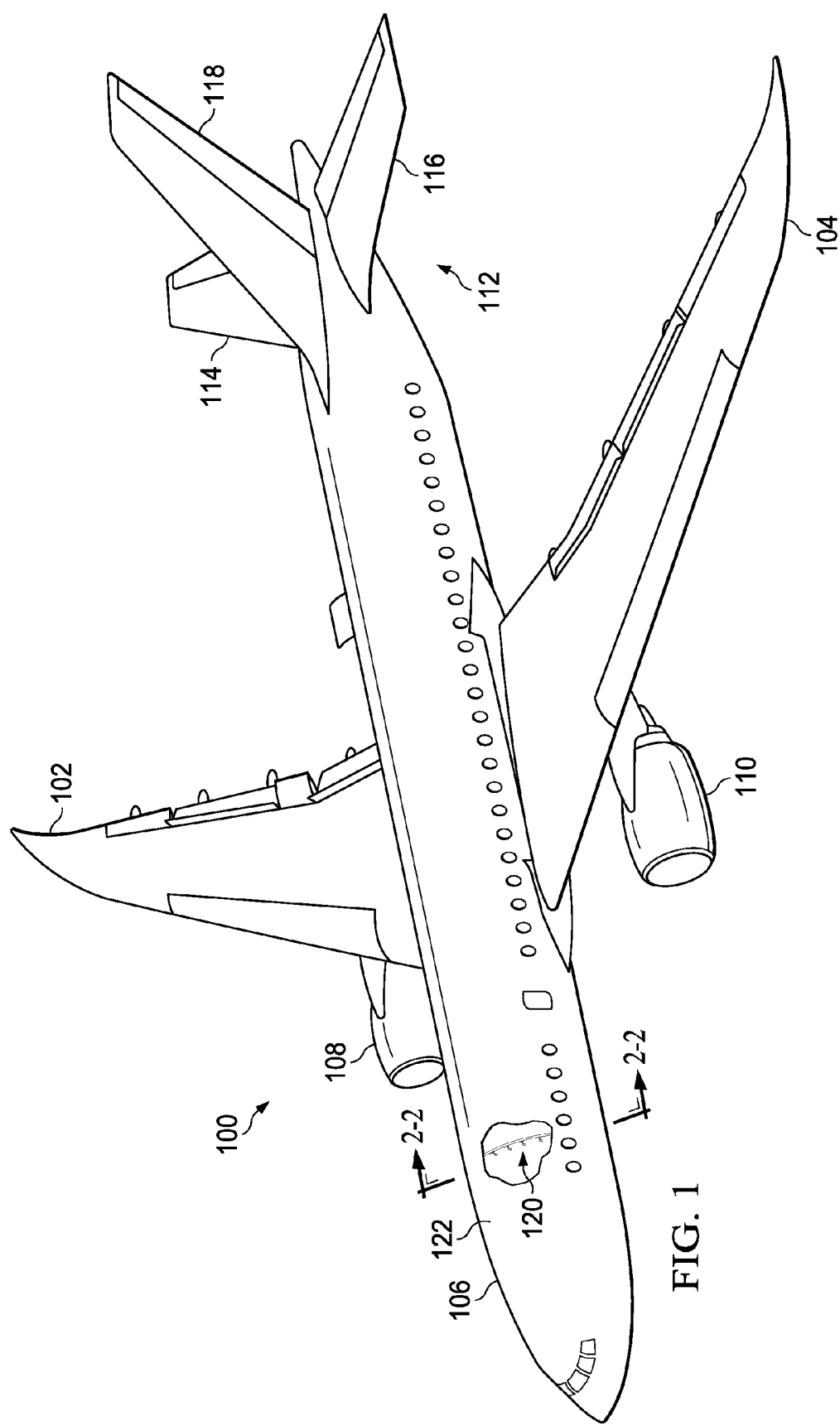
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a composite filler may be implemented in accordance with an illustrative embodiment. For example, composite fillers may be placed between stiffeners 120 and composite skin 122 of aircraft 100. FIG. 1 depicts an exposed view of stiffeners 120.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
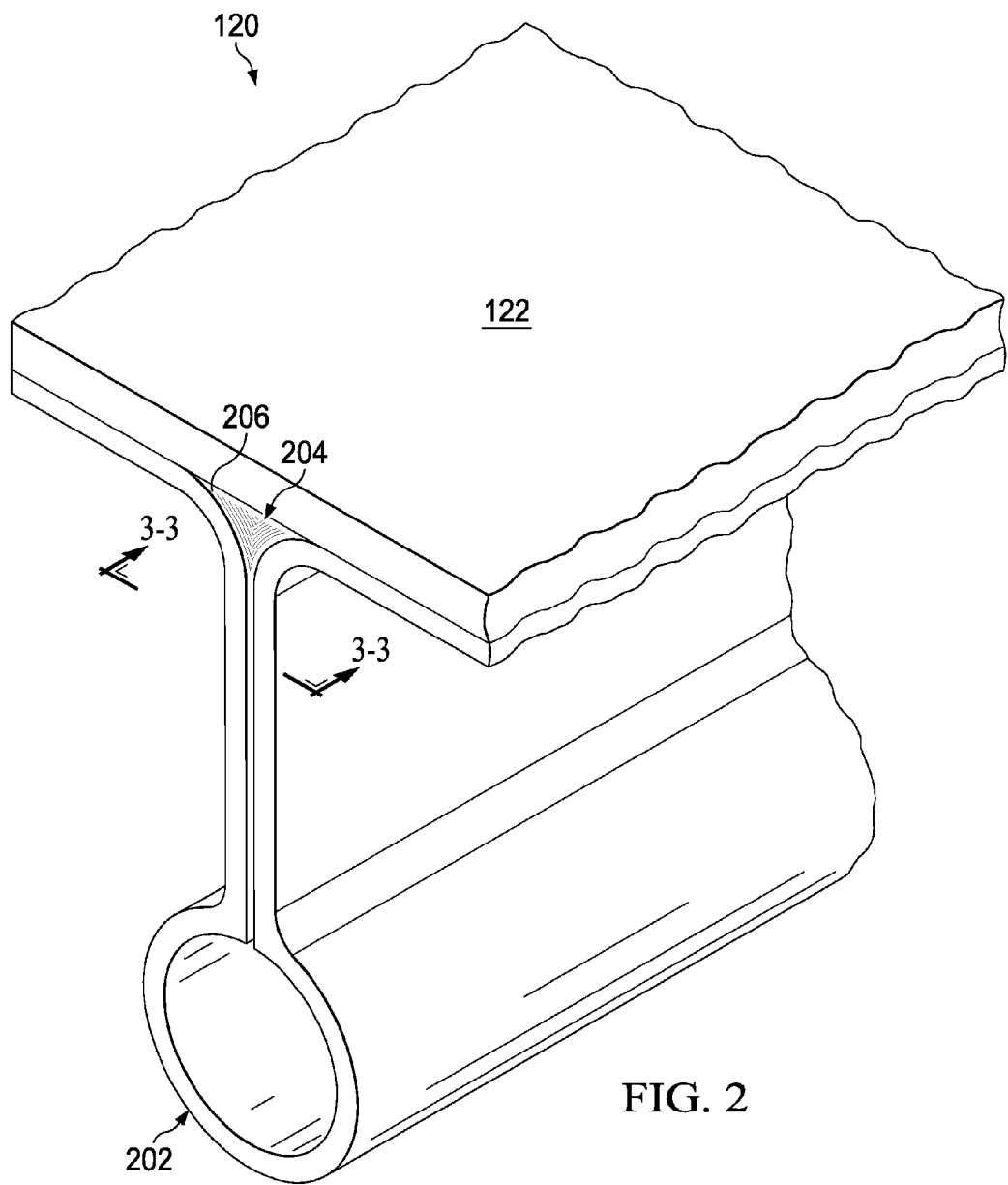
FIG. 2 is an illustration of an isometric view of a composite filler and a composite structural member in accordance with an illustrative embodiment.

Turning now to FIG. 2, an illustration of an isometric view of a composite filler and a composite structural member is depicted in accordance with an illustrative embodiment. Specifically, FIG. 2 is an enlarged view of stiffener 202 of stiffeners 120 in section 2-2 of FIG. 1. As depicted, composite filler 204 is placed in gap 206 formed by stiffener 202 and composite skin 122. In this illustrative example, composite filler 204 has a substantially triangular cross-section. Although stiffener 202 is a single composite structural member, in some illustrative examples, stiffener 202 may instead be two or more composite structural members. Throughout, "composite structural member" and "composite structure" may be used interchangeably. In some illustrative examples, stiffener 202 is a composite stringer.

Figure 3:
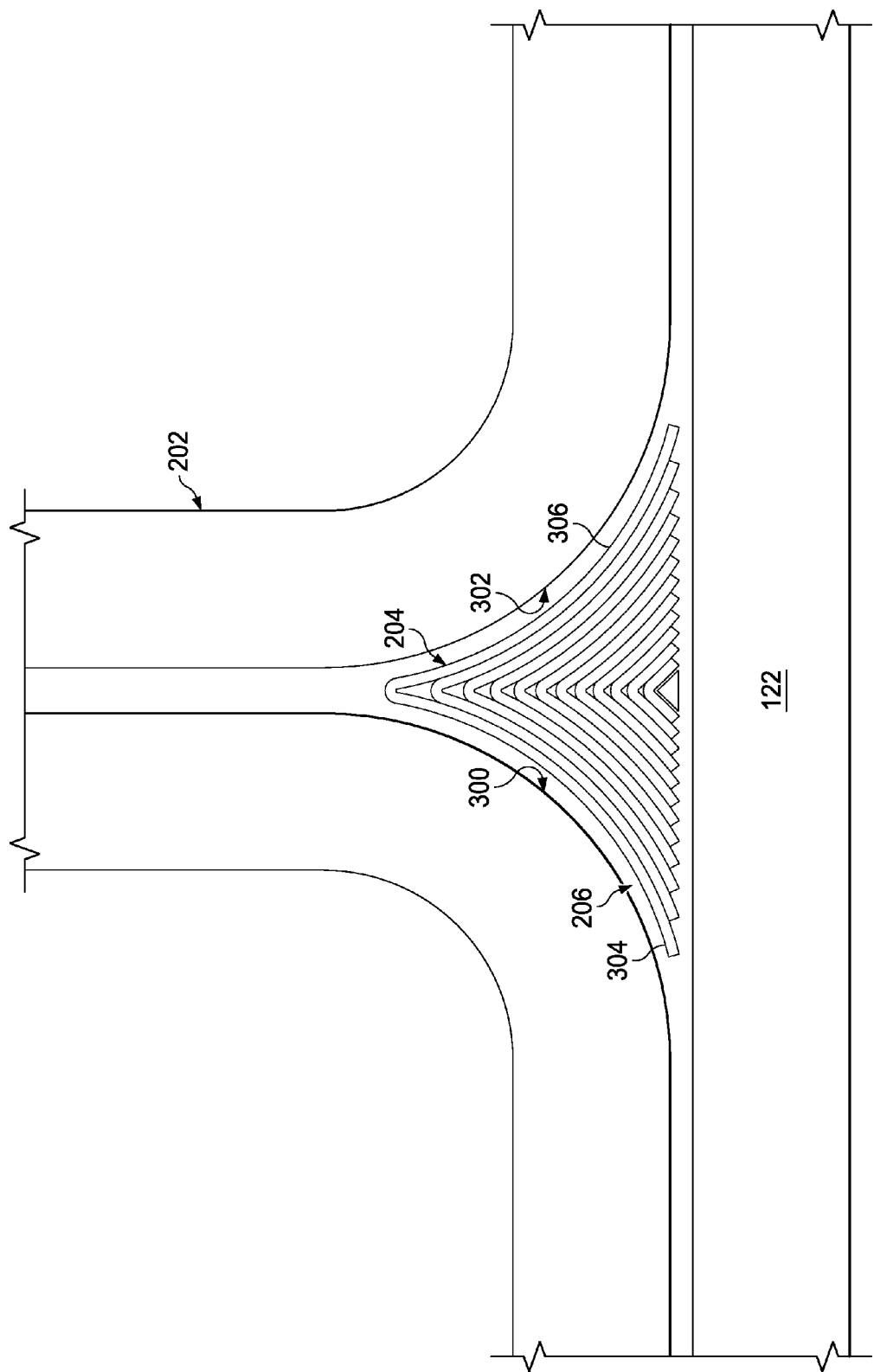
FIG. 3 is an illustration of a front view of a composite filler and a composite structural member in accordance with an illustrative embodiment.

Turning now to FIG. 3, an illustration of a front view of a composite filler and a composite structural member is depicted in accordance with an illustrative embodiment. Specifically, FIG. 3 is a view of stiffener 202, composite filler 204, and composite skin 122 from direction 3-3 of FIG. 2.

Stiffener 202 has radius 300 and radius 302. First side 304 of composite filler 204 follows radius 300. Second side 306 of composite filler 204 follows radius 302.

Figure 4:
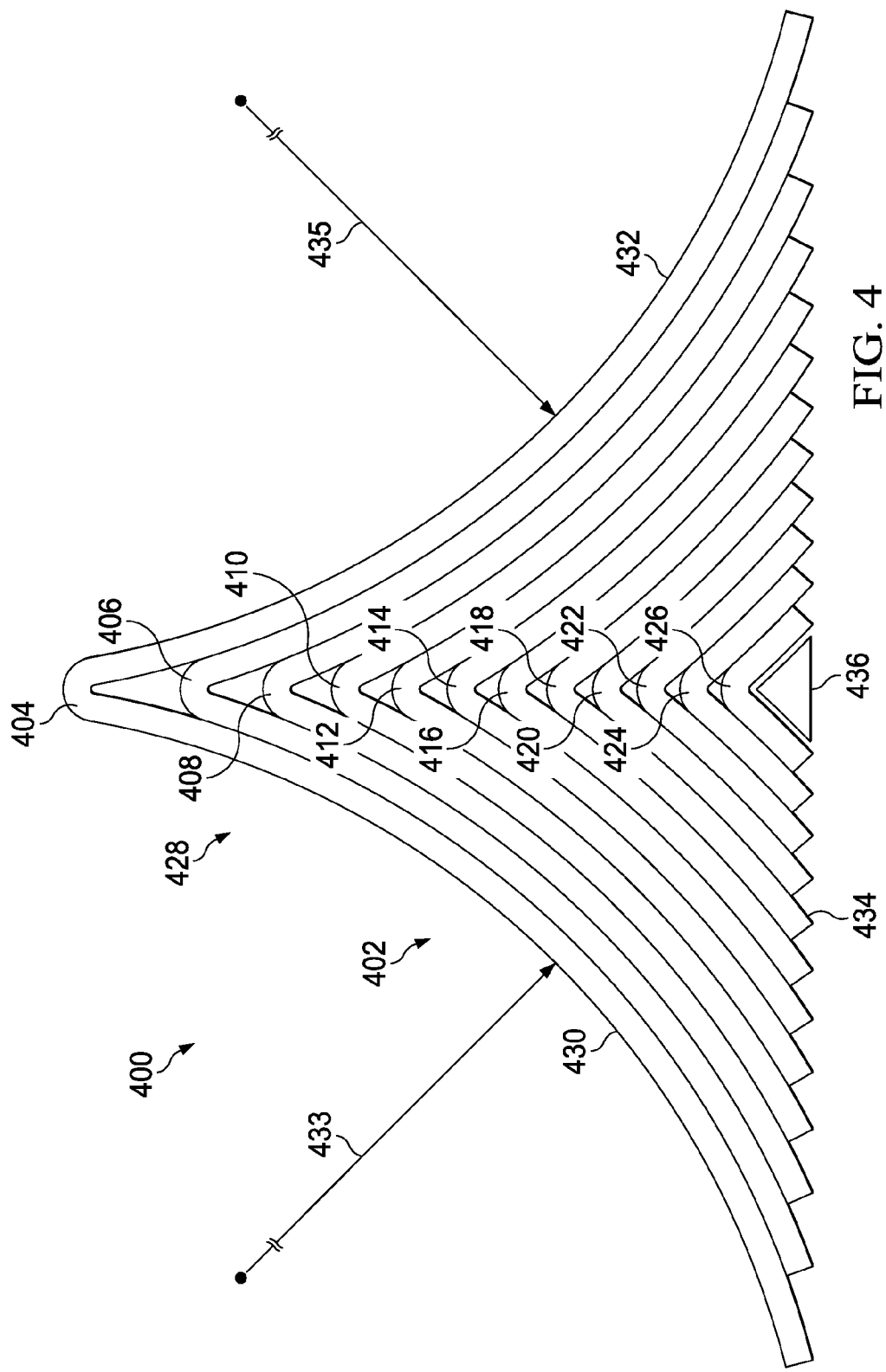
FIG. 4 is an illustration of a front view of a composite filler in accordance with an illustrative embodiment.

Turning now to FIG. 4, an illustration of a front view of a composite filler is depicted in accordance with an illustrative embodiment. Composite filler 400 may be an embodiment of composite filler 204 in FIG. 2 and FIG. 3. Composite filler 400 is formed of plurality of layers 402. Plurality of layers 402 are formed of at least one composite material.

Plurality of layers 402 may comprise one or more ply orientations. Specifically, plurality of layers 402 may have at least one of 0 degree plies, +/−10 degree plies, +/−15 degree plies, +/−30 degree plies, +/−45 degree plies, +/−60 degree plies, +/−75 degree plies, or +/−90 degree plies.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In this illustrative example, plurality of layers 402 includes first layer 404, second layer 406, third layer 408, fourth layer 410, fifth layer 412, sixth layer 414, seventh layer 416, eighth layer 418, ninth layer 420, tenth layer 422, eleventh layer 424, and twelfth layer 426. Although plurality of layers 402 includes twelve layers in this illustrative example, plurality of layers 402 may include any number of layers equal to or greater than two layers.

Each of plurality of layers 402 has respective bent shapes 428. Each of respective bent shapes 428 may have a different angle. Each of plurality of layers 402 may stack or nest to form composite filler 400.

As can be seen from FIG. 4, each layer of plurality of layers 402 has a respective length. In this illustrative example, first layer 404 is longer than each other layer in plurality of layers 402. In this illustrative example, each successive layer in plurality of layers 402 is shorter than each previous layer. For example, third layer 408 is shorter than both second layer 406 and first layer 404.

First layer 404 forms first side 430 and second side 432 of composite filler 400. First side 430 and second side 432 of composite filler 400 may contact a composite structural member. First side 430 has radius 433. Second side 432 has radius 435. Plurality of layers 402 follows radius 433 and radius 435. Plurality of layers 402 following radius 433 and radius 435 may direct a load along at least one of radius 433 and radius 435. Third side 434 of composite filler 400 is formed of plurality of layers 402. Third side 434 may contact a composite part such as a composite skin.

As depicted, composite filler 400 includes extruded material 436. Extruded material 436 is positioned next to twelfth layer 426. Extruded material 436 may be present to fill a gap in composite filler 400. In some examples, composite filler 400 may only have plurality of layers 402.

As depicted, each of plurality of layers 402 comprises a single ply. However, in other illustrative examples, at least one of plurality of layers 402 may comprise multiple plies.

Figure 5:
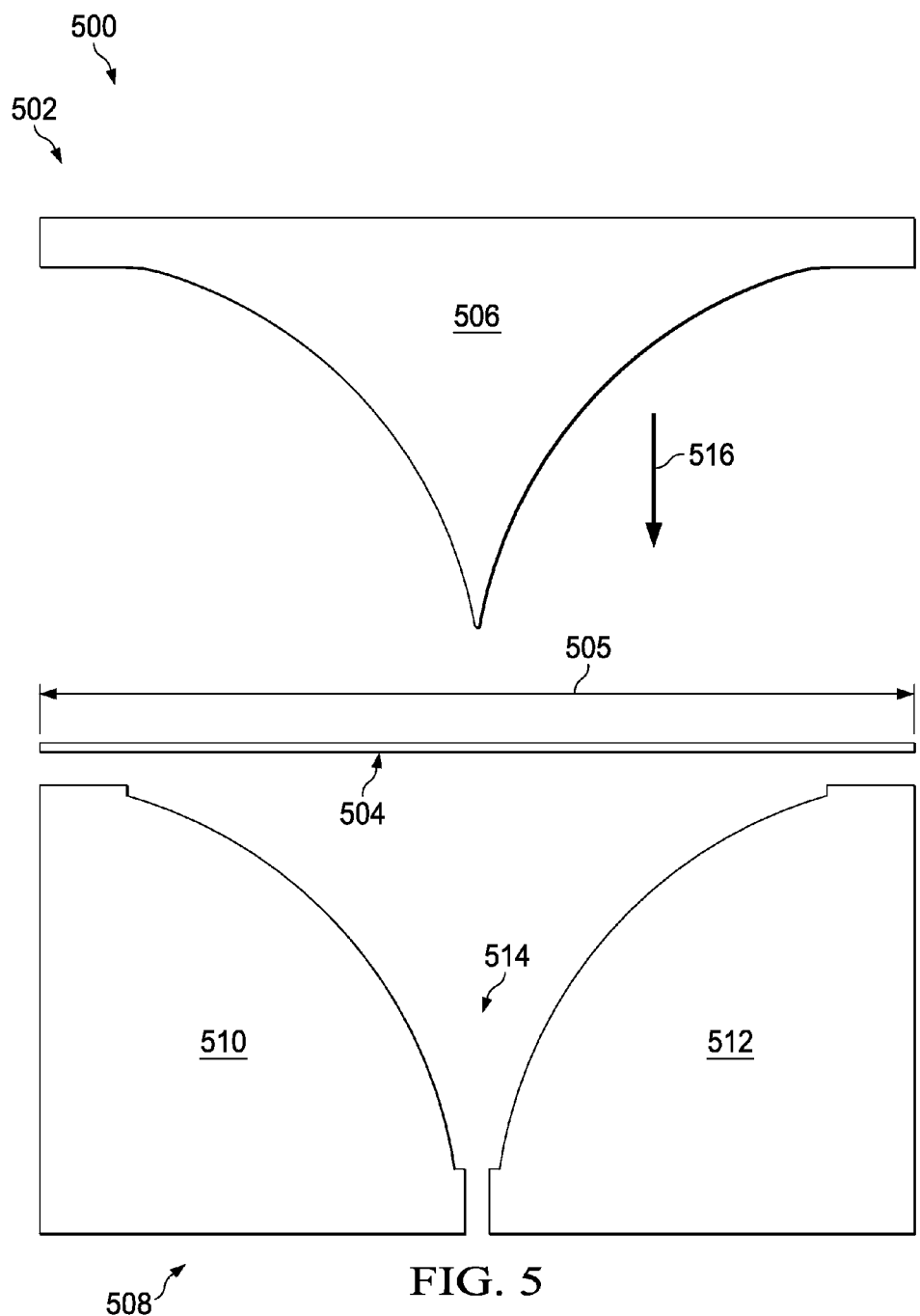
FIG. 5 is an illustration of a first layer and shaping equipment in accordance with an illustrative embodiment.

Turning now to FIG. 5, an illustration of a first layer and shaping equipment is depicted in accordance with an illustrative embodiment. Manufacturing environment 500 may be an example of a manufacturing environment for forming composite filler 400 in FIG. 4. Manufacturing environment 500 includes shaping equipment 502 and first layer 504. First layer 504 may be formed of a composite material. In illustrative examples in which first layer 504 is formed of a composite material, first layer 504 may also be referred to as a first composite layer. First layer 504 has length 505. Shaping equipment 502 includes first die punch 506 and base 508.

As depicted, base 508 includes first portion 510, second portion 512, and gap 514. To form a composite filler, first die punch 506 may be moved towards base 508 in the direction of arrow 516. By moving first die punch 506 towards base 508, shaping equipment 502 may change the shape of first layer 504. In this example, first die punch 506 contacts first layer 504 and applies a load on first layer 504 in the direction of arrow 516. Specifically, by moving first die punch 506 towards base 508, shaping equipment 502 may form first layer 504 to base 508.

Figure 6:
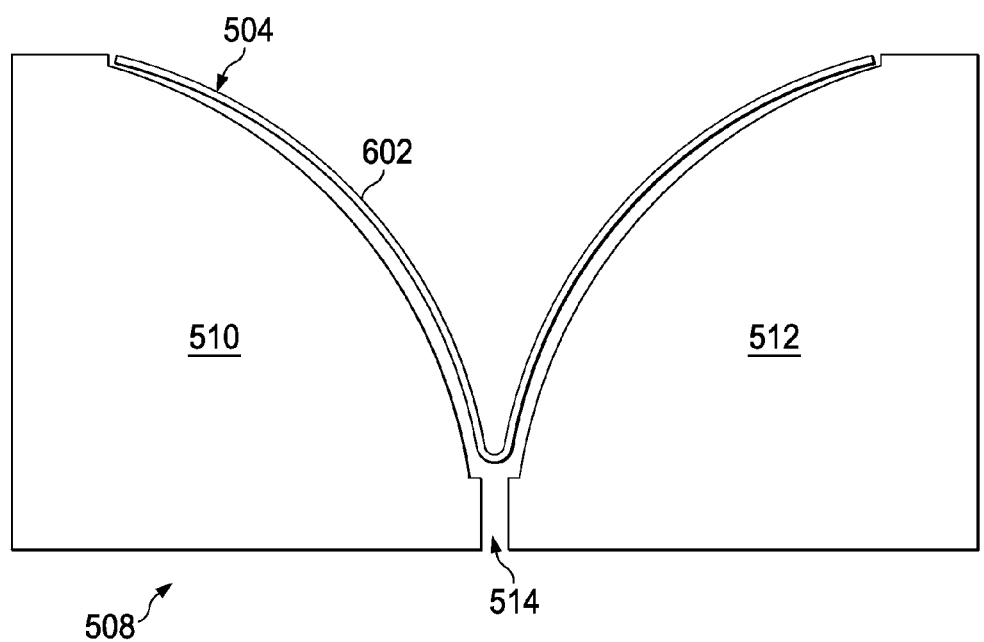
FIG. 6 is an illustration of a first layer having a first bent shape and shaping equipment in accordance with an illustrative embodiment.

Turning now to FIG. 6, an illustration of a first layer having a first bent shape and shaping equipment is depicted in accordance with an illustrative embodiment. As depicted, first layer 504 has been formed to base 508. The movement of first die punch 506 towards base 508 in the direction of arrow 516 in FIG. 5 has changed the shape of first layer 504. As depicted, first layer 504 has first bent shape 602. First layer 504 contacts first portion 510 and second portion 512 and extends into gap 514.

Figure 7:
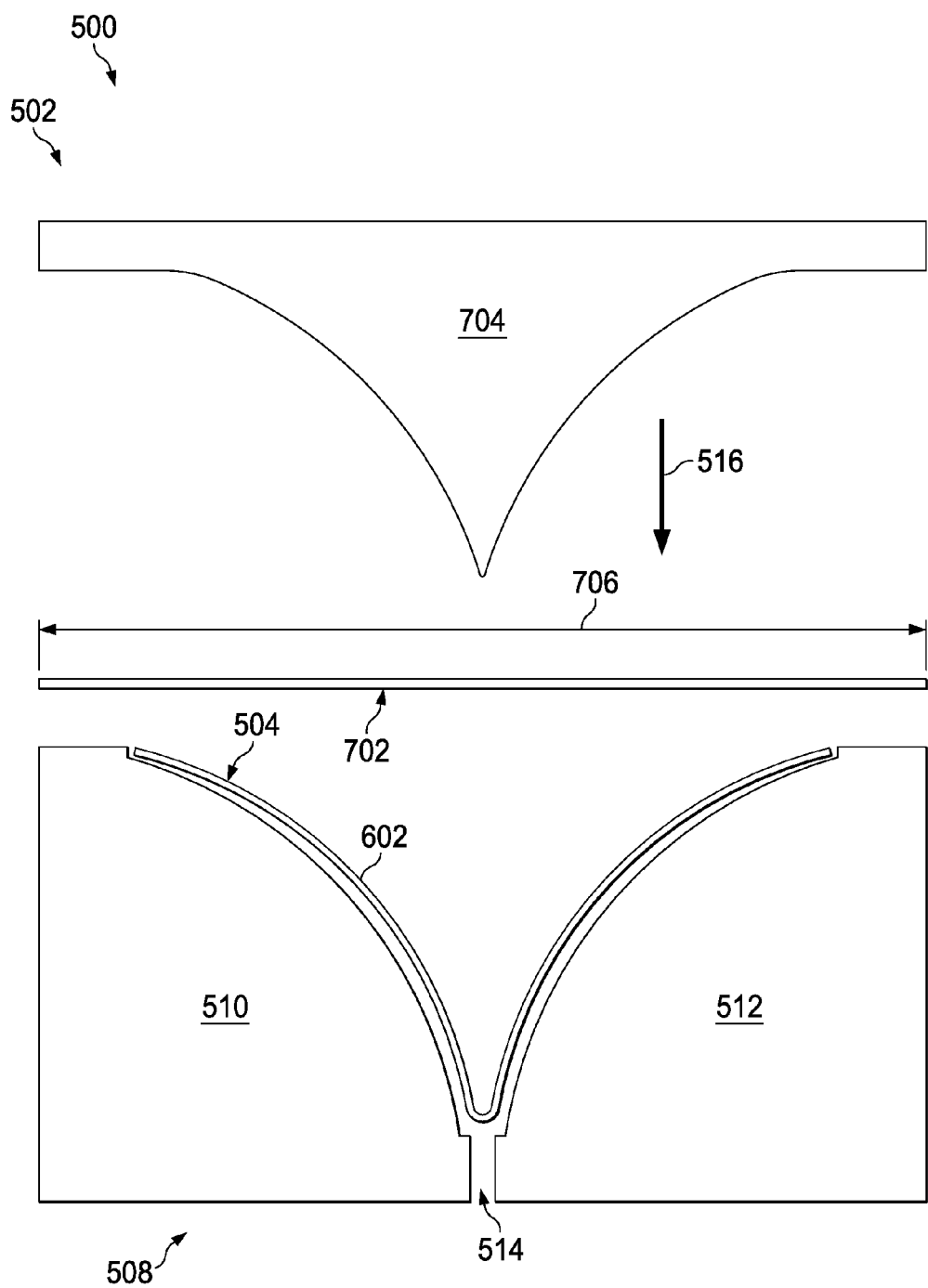
FIG. 7 is an illustration of a second layer, a first layer having a first bent shape, and shaping equipment in accordance with an illustrative embodiment.

Turning now to FIG. 7, an illustration of a second layer, a first layer having a first bent shape, and shaping equipment is depicted in accordance with an illustrative embodiment. As depicted, manufacturing environment 500 includes shaping equipment 502, first layer 504, and second layer 702. In this example, shaping equipment 502 includes base 508 and second die punch 704. As depicted first layer 504 is formed to base 508, and second layer 702 having length 706 is positioned relative to first layer 504.

Second layer 702 may be formed of a composite material. In illustrative examples in which second layer 702 is formed of a composite material, second layer 702 may also be referred to as a second composite layer. Length 706 of second layer 702 is less than length 505 of first layer 504 in FIG. 5. Further, shape of second die punch 704 is different than the shape of first die punch 506 in FIG. 5.

To form the composite filler, second die punch 704 may be moved towards base 508 in the direction of arrow 516. In this example, second die punch 704 contacts second layer 702 and applies a load on second layer 702 in the direction of arrow 516. By moving second die punch 704 towards base 508, shaping equipment 502 may change the shape of second layer 702. Specifically, by moving second die punch 704 towards base 508, shaping equipment 502 may form second layer 702 to first layer 504.

Figure 8:
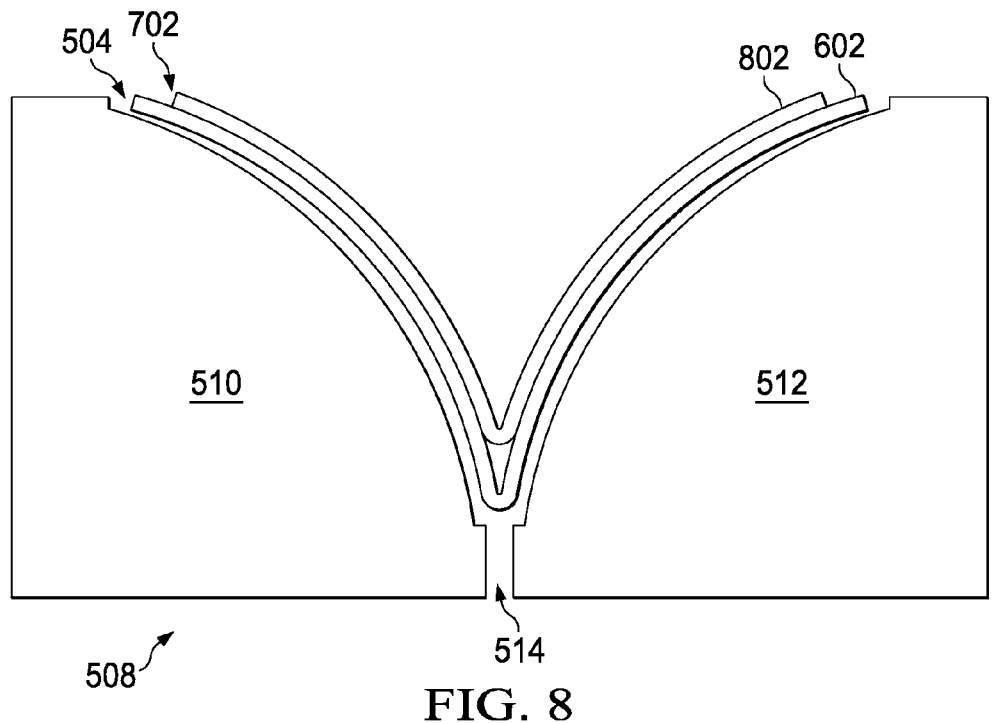
FIG. 8 is an illustration of a first layer having a first bent shape, a second layer having a second bent shape, and shaping equipment in accordance with an illustrative embodiment.

Turning now to FIG. 8, an illustration of a first layer having a first bent shape, a second layer having a second bent shape, and shaping equipment is depicted in accordance with an illustrative embodiment. As depicted, second layer 702 has been formed to first layer 504 on base 508. Second layer 702 has second bent shape 802. As can be seen from FIG. 8, second bent shape 802 is different than first bent shape 602 such that second layer 702 is formed to first layer 504.

Figure 9:
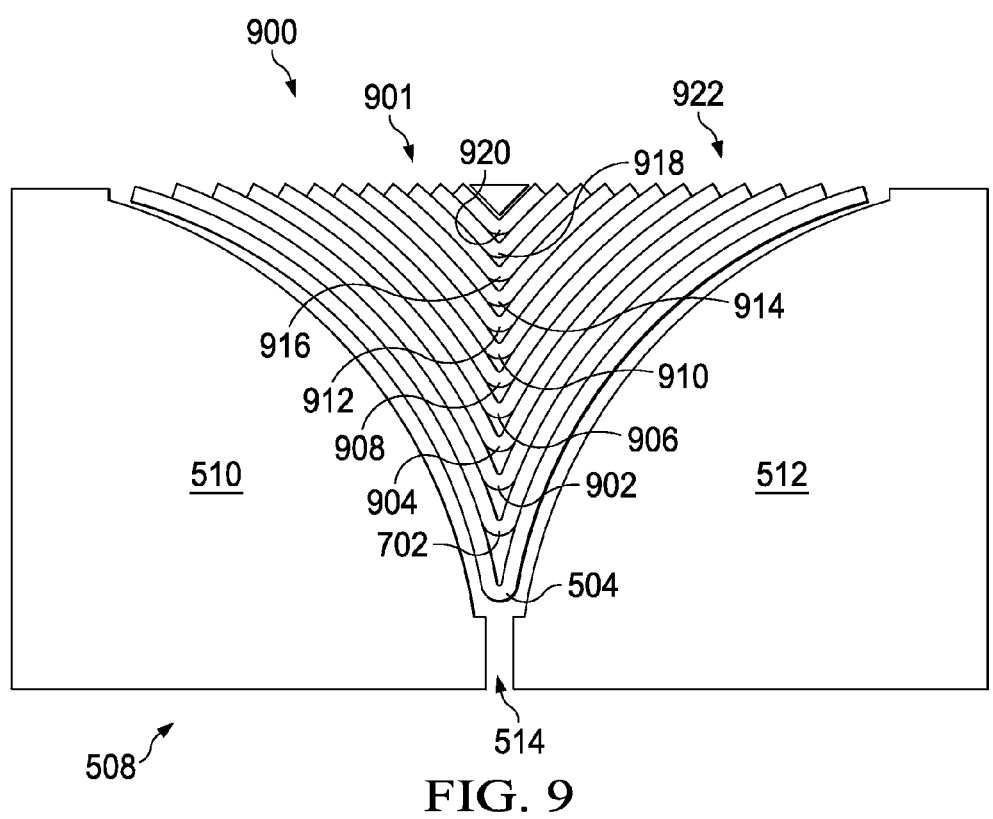
FIG. 9 is an illustration of a plurality of layers having respective bent shapes and shaping equipment in accordance with an illustrative embodiment.

Turning now to FIG. 9, an illustration of a plurality of layers having respective bent shapes and shaping equipment is depicted in accordance with an illustrative embodiment. As depicted, composite filler 900 is formed to base 508. Composite filler 900 is formed from plurality of layers 901. Plurality of layers 901 comprises first layer 504, second layer 702, third layer 902, fourth layer 904, fifth layer 906, sixth layer 908, seventh layer 910, eighth layer 912, ninth layer 914, tenth layer 916, eleventh layer 918, and twelfth layer 920. Each of plurality of layers 901 comprises respective bent shapes 922. Respective bent shapes 922 comprise first bent shape 602 and second bent shape 802 from FIG. 6 and FIG. 8, respectively.

Each of plurality of layers 901 may be formed into respective bent shapes 922 by a plurality of successive die punches having different shapes. In some illustrative examples, each die punch of the plurality of die punches may have a different respective bent shape to form each successive layer of plurality of layers 901. In other illustrative examples, a die punch of the plurality of die punches may be used to form more than one layer of plurality of layers 901. In one illustrative example, a die punch of the plurality of die punches may be used to form two successive layers of plurality of layers 901.

Figure 10:
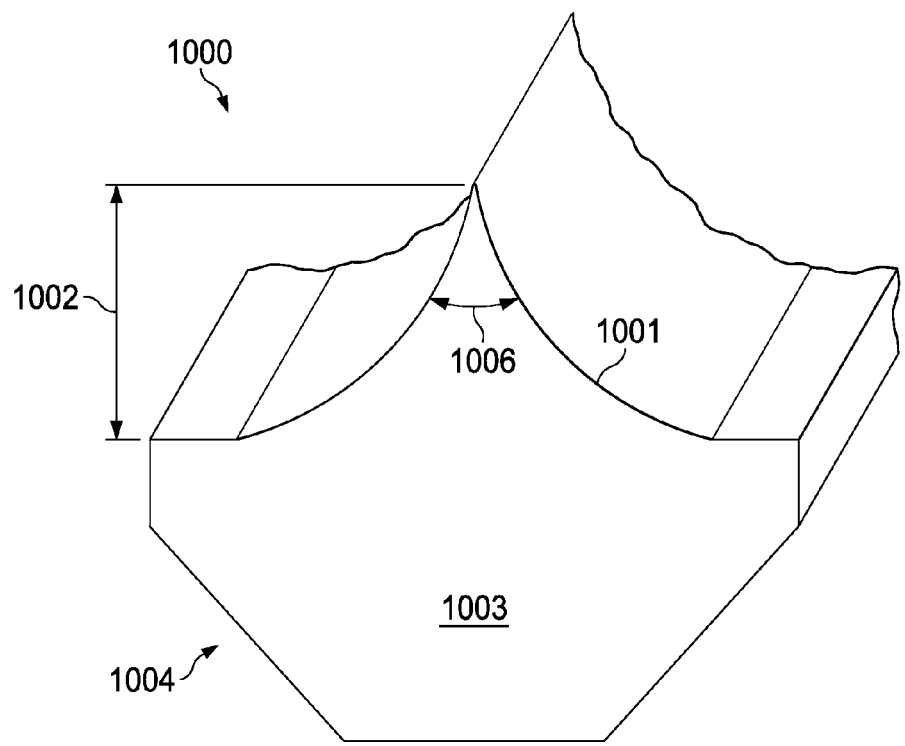
FIG. 10 is an illustration of a first die punch in accordance with an illustrative embodiment.

FIGS. 10-15 are illustrations of die punches that may be used to shape a plurality of layers into bent shapes. Turning first to FIG. 10, an illustration of a first die punch is depicted in accordance with an illustrative embodiment. First die punch 1000 may be an example of first die punch 506 from FIG. 5. First die punch 1000 may be used to form a composite layer such as first layer 504 of FIG. 5.

First die punch 1000 has shaping portion 1001 and base 1003. Shaping portion 1001 has height 1002, cross-section 1004, and angle 1006.

Figure 11:
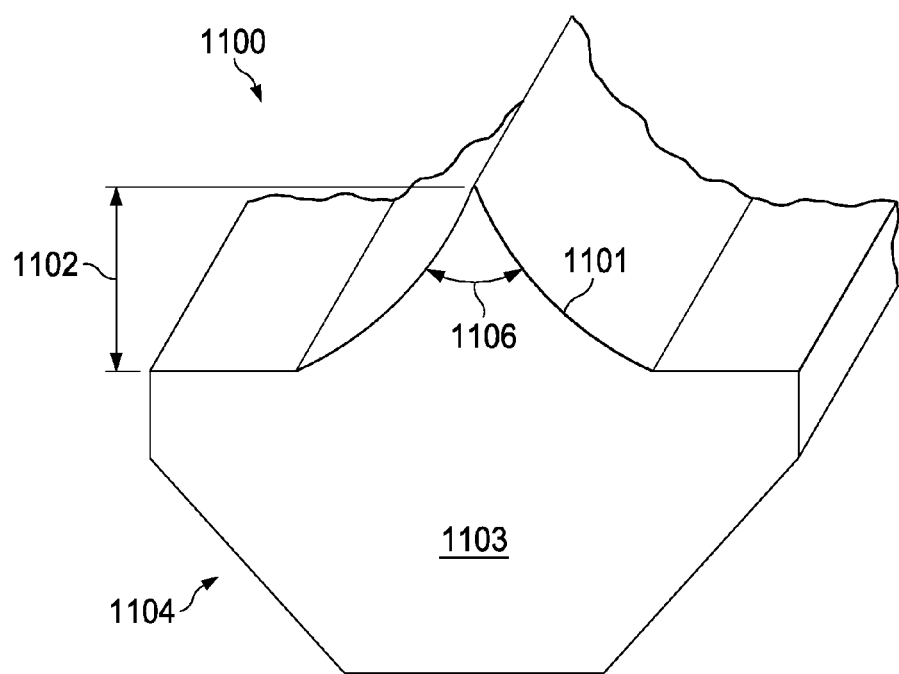
FIG. 11 is an illustration of a second die punch in accordance with an illustrative embodiment.

Turning now to FIG. 11, an illustration of a second die punch is depicted in accordance with an illustrative embodiment. Second die punch 1100 may be an example of second die punch 704 from FIG. 7. Second die punch 1100 may be used to form a composite layer such as second layer 702 of FIG. 7.

Second die punch 1100 has shaping portion 1101 and base 1103. Shaping portion 1101 has height 1102, cross-section 1104, and angle 1106. As can be seen from FIG. 10 and FIG. 11, height 1102 is less than height 1002 of first die punch 1000.

Figure 12:
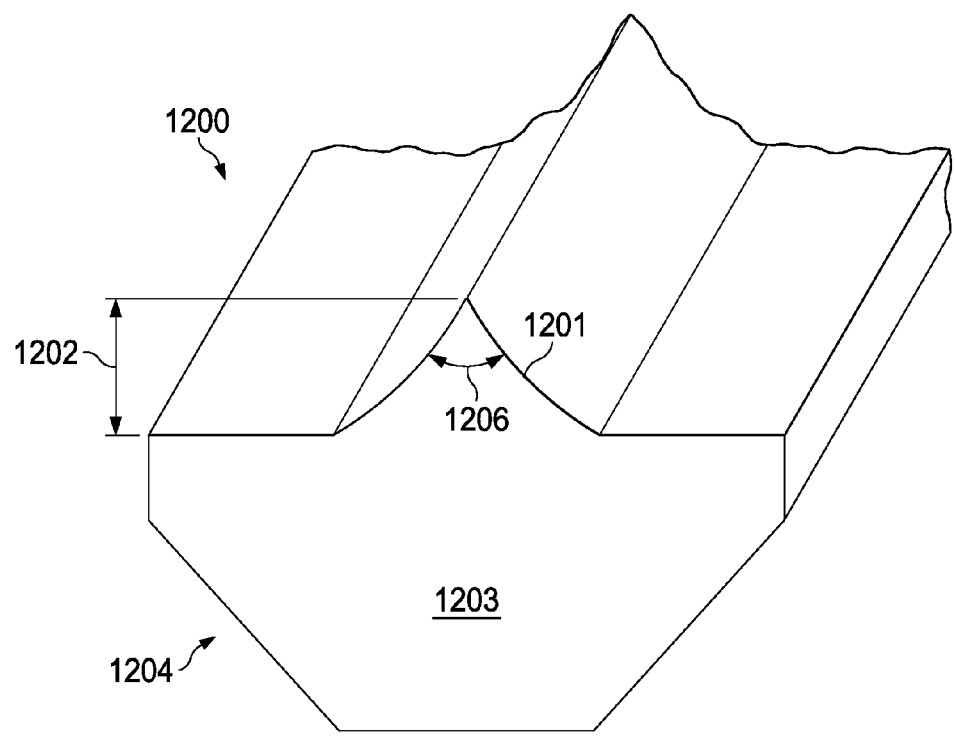
FIG. 12 is an illustration of a third die punch in accordance with an illustrative embodiment.

Turning now to FIG. 12, an illustration of a third die punch is depicted in accordance with an illustrative embodiment. Third die punch 1200 may be an example of a successive die punch used on a successive composite layer after a composite layer is formed using second die punch 1100. Third die punch 1200 may be used to form a composite layer such as third layer 902 of FIG. 9.

Third die punch 1200 has shaping portion 1201 and base 1203. Shaping portion 1201 has height 1202, cross-section 1204, and angle 1206. As can be seen from FIGS. 10-12, height 1202 is less than both height 1102 and height 1002 of second die punch 1100 and first die punch 1000, respectively.

Figure 13:
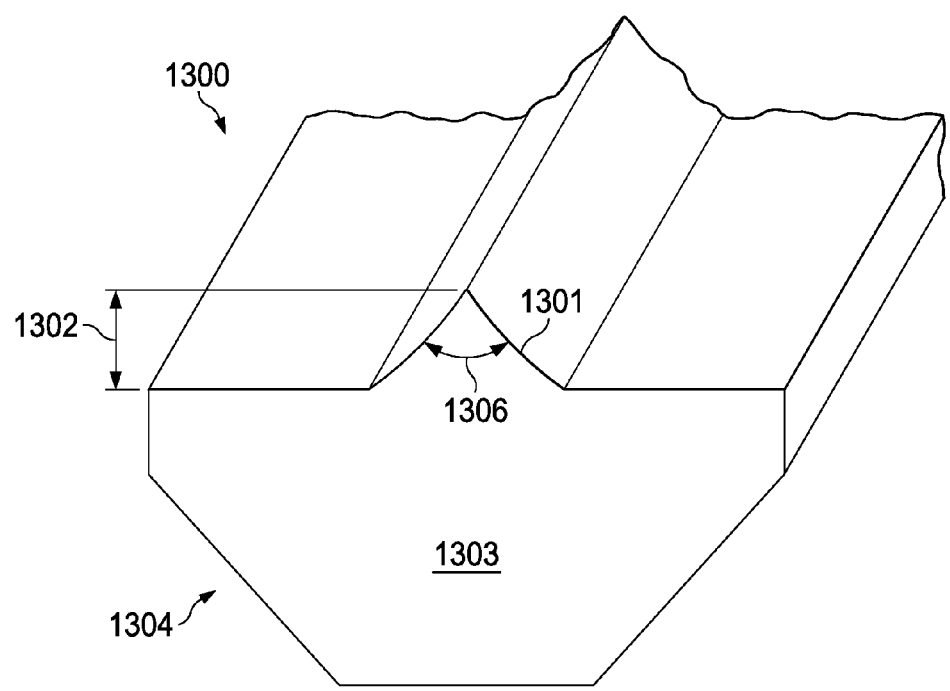
FIG. 13 is an illustration of a fourth die punch in accordance with an illustrative embodiment.

Turning now to FIG. 13, an illustration of a fourth die punch is depicted in accordance with an illustrative embodiment. Fourth die punch 1300 may be an example of a successive die punch used on a successive composite layer after a composite layer is formed using third die punch 1200 in FIG. 12. Fourth die punch 1300 may be used to form a composite layer such as fourth layer 904 of FIG. 9.

Fourth die punch 1300 has shaping portion 1301 and base 1303. Shaping portion 1301 has height 1302, cross-section 1304, and angle 1306. As can be seen from FIGS. 10-13, height 1302 is less than height 1202, height 1102, and height 1002 of third die punch 1200, second die punch 1100, and first die punch 1000, respectively.

Figure 14:
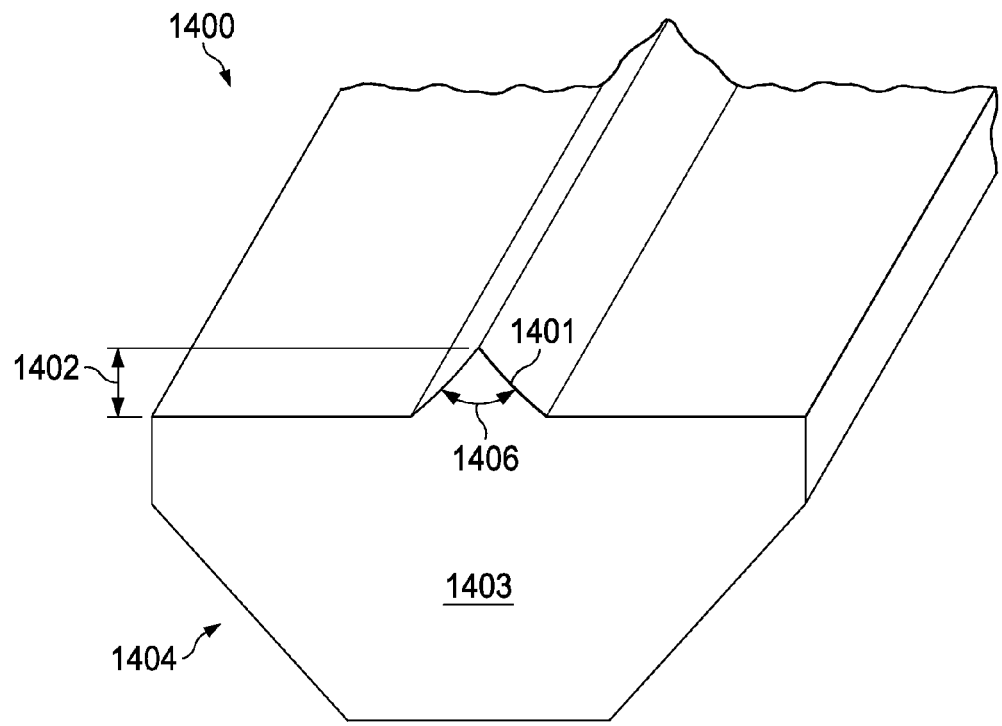
FIG. 14 is an illustration of a fifth die punch in accordance with an illustrative embodiment.

Turning now to FIG. 14, an illustration of a fifth die punch is depicted in accordance with an illustrative embodiment. Fifth die punch 1400 may be an example of a successive die punch used on a successive composite layer after a composite layer is formed using fourth die punch 1300 in FIG. 13. Fifth die punch 1400 may be used to form a composite layer such as fifth layer 906 of FIG. 9.

Fifth die punch 1400 has shaping portion 1401 and base 1403. Shaping portion 1401 has height 1402, cross-section 1404, and angle 1406. As can be seen from FIGS. 10-14, height 1402 is less than height 1302, height 1202, height 1102, and height 1002 of fourth die punch 1300, third die punch 1200, second die punch 1100, and first die punch 1000, respectively.

Figure 15:
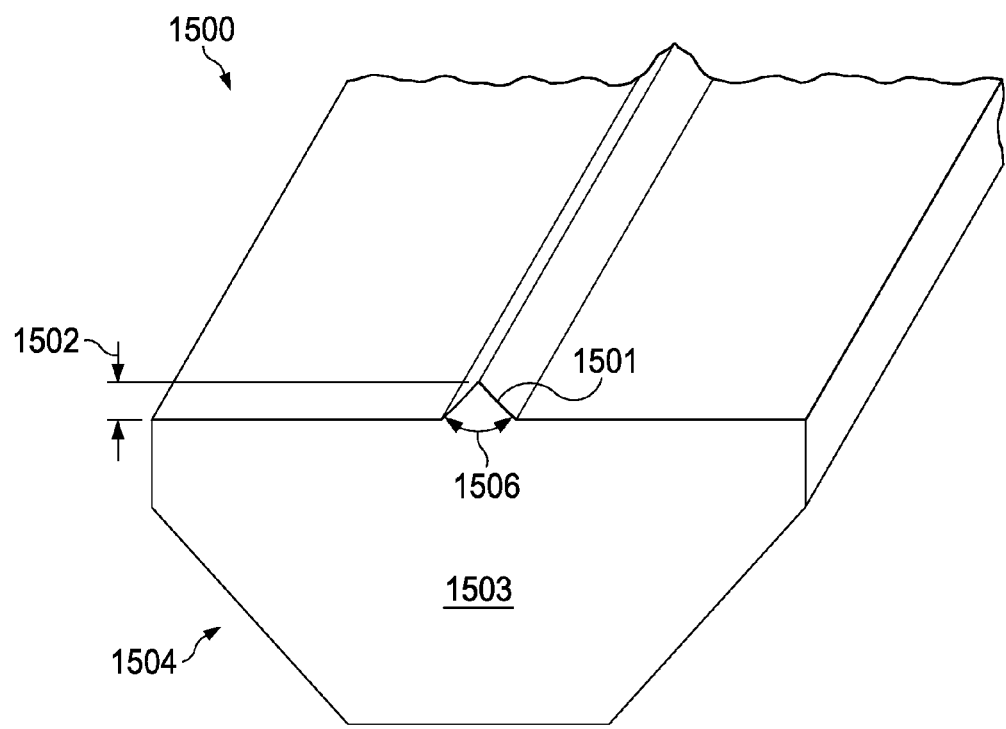
FIG. 15 is an illustration of a sixth die punch in accordance with an illustrative embodiment.

Turning now to FIG. 15, an illustration of a sixth die punch is depicted in accordance with an illustrative embodiment. Sixth die punch 1500 may be an example of a successive die punch used on a successive composite layer after a composite layer is formed using fifth die punch 1400 in FIG. 14. Sixth die punch 1500 may be used to form a composite layer such as sixth layer 908 of FIG. 9.

Sixth die punch 1500 has shaping portion 1501 and base 1503. Shaping portion 1501 has height 1502, cross-section 1504, and angle 1506. As can be seen from FIGS. 10-15, height 1502 is less than height 1402, height 1302, height 1202, height 1102, and height 1002 of fifth die punch 1400, fourth die punch 1300, third die punch 1200, second die punch 1100, and first die punch 1000, respectively.

The illustrations of the die punches and shaping equipment in FIGS. 5-15 are not meant to imply physical or architectural limitations to the manner in which an illustrative embodiment may be implemented. The die punches in FIGS. 10-15 provide some non-limiting examples of shapes for die punches. Further, although base 508 as depicted includes first portion 510, second portion 512, and gap 514, in some illustrative examples, shaping equipment 502 may comprise different configurations than those depicted. Base 508 is only one non-limiting example of a base, such as base 1758 of FIG. 17 below.

Figure 16:
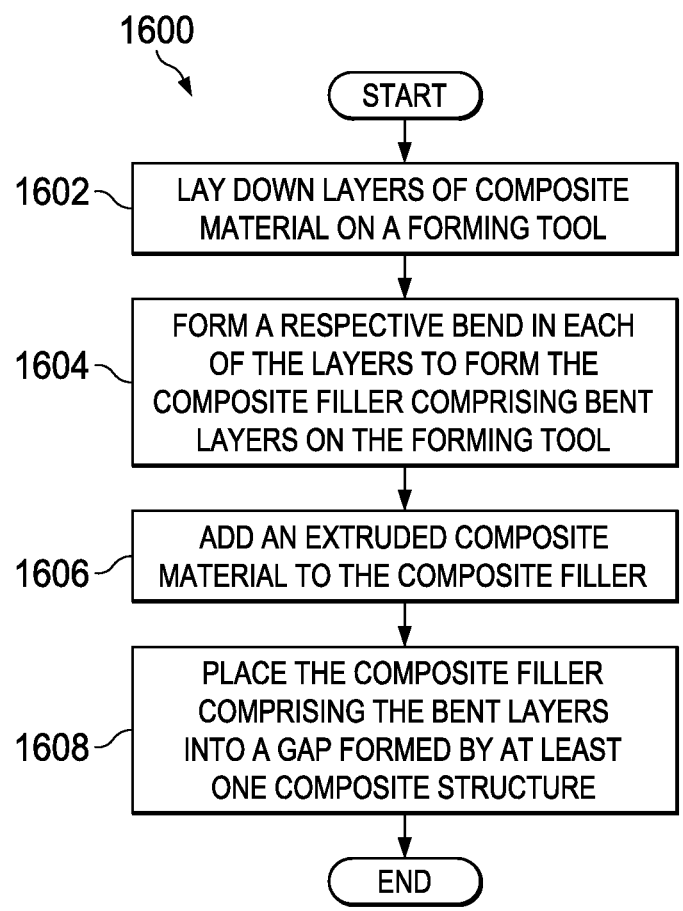
FIG. 16 is an illustration of a flowchart of a process for forming a composite filler in accordance with an illustrative embodiment.

Turning now to FIG. 16, an illustration of a flowchart of a process for forming a composite filler in accordance with an illustrative embodiment. The process illustrated in FIG. 16 may be implemented in a manufacturing environment such as manufacturing environment 500 of FIG. 5 to form a composite filler such as composite filler 400 of FIG. 4. For example, the operations of this process may be implemented using shaping equipment 502 of FIG. 5.

The process may begin by laying down layers of composite material on a forming tool (operation 1602). In some illustrative examples, at least one layer of the layers of the composite material comprises multiple plies of composite material. In some illustrative examples, each successive layer of composite material has a shorter width than a width of a previous layer of composite material. For example, in FIG. 4, each of plurality of layers 402 has successively shorter widths.

The process may then form a respective bend in each of the layers to form the composite filler comprising bent layers on the forming tool (operation 1604). In some illustrative examples, each layer of the layers of the composite material is laid down and then formed prior to laying down a successive layer in the layers of the composite material. Illustrative examples of forming successive layers may be seen in FIGS. 5-8. In some illustrative examples, forming the respective bend in each of the layers comprises individually forming a respective bend in each of the layers.

In some illustrative examples, forming the respective bend in each of the layers comprises using a series of die punches, each having a respective cross-section and a desired angle to form a respective bend in one of the layers. FIGS. 10-15 may be examples of die punches each having a respective cross-section and a desired angle. In some illustrative examples, forming the respective bend in each of the layers forms a first side and a second side of the composite filler. As can be seen from FIG. 4, first layer 404 of plurality of layers 402 may form first side 430 and second side 432 of composite filler 400.

The process may then add an extruded composite material to the composite filler (operation 1606). This extruded composite material may optionally be added to the composite filler before using the composite filler.

The process may then place the composite filler comprising the bent layers into a gap formed by at least one composite structure (operation 1608), with the process terminating thereafter. In some illustrative examples, the cross-section of the composite filler is substantially triangular. For example, the cross-section of composite filler 400 is substantially triangular. In some illustrative examples, the at least one composite structure comprises a composite stringer.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented. For example, operation 1606 may not be performed. In this example, the composite filler does not include optional extruded material.

Figure 17:
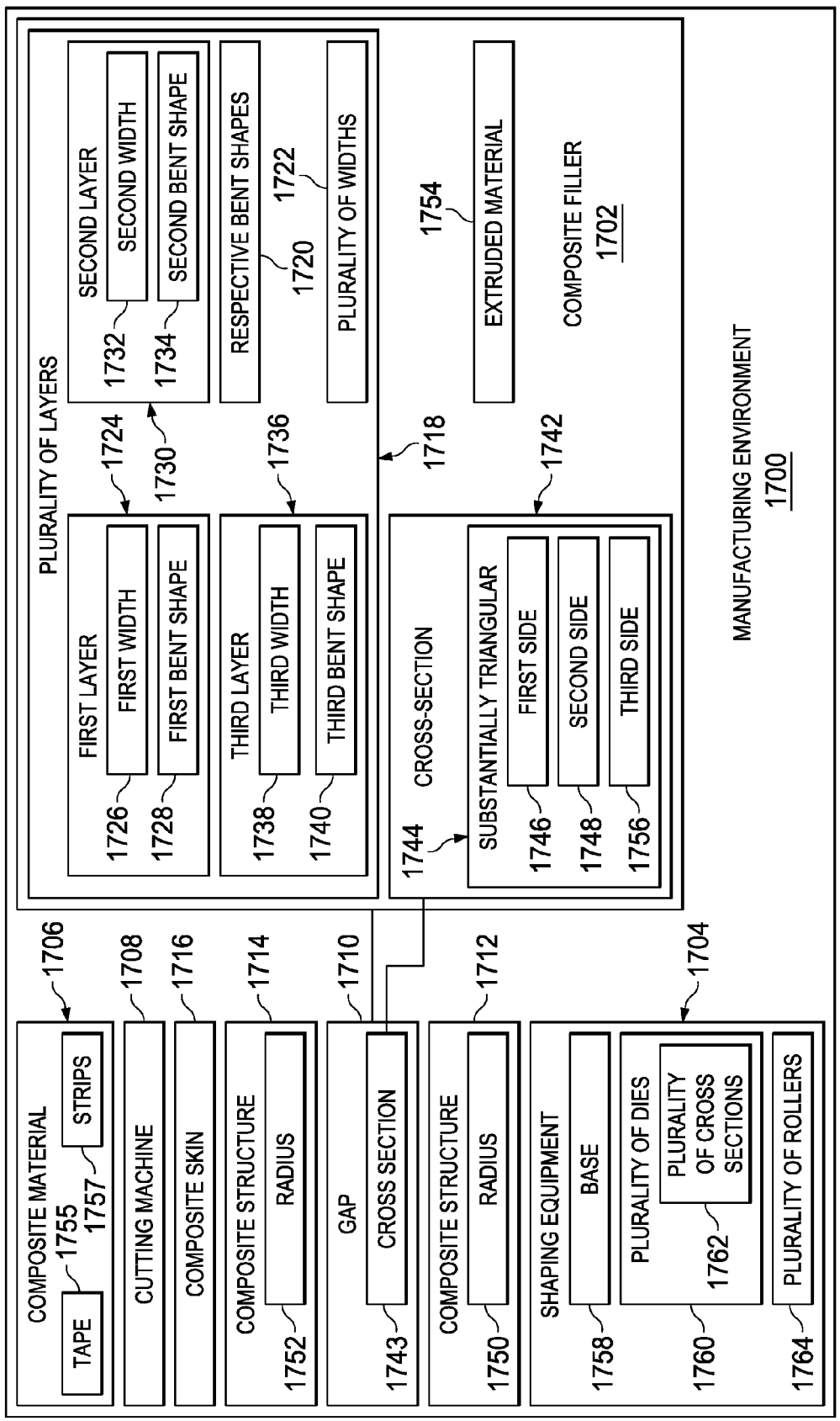
FIG. 17 is an illustration of a block diagram of a manufacturing environment in accordance with an illustrative embodiment.

Turning now to FIG. 17, an illustration of a block diagram of a manufacturing environment is depicted in accordance with an illustrative embodiment. Manufacturing environment 500 in FIG. 5 is an example of a physical implementation of manufacturing environment 1700 shown in block form in FIG. 17.

Manufacturing environment 1700 comprises composite filler 1702, shaping equipment 1704, composite material 1706, and cutting machine 1708. Composite filler 1702 may be configured to be placed in gap 1710 formed by composite structure 1712, composite structure 1714, and composite skin 1716.

Composite filler 1702 is formed of plurality of layers 1718. Plurality of layers 1718 may be formed of composite material 1706. In illustrative examples in which plurality of layers 1718 is formed of composite material 1706, plurality of layers 1718 may also be referred to as a plurality of composite layers. Plurality of layers 1718 has respective bent shapes 1720. Plurality of layers 1718 has plurality of widths 1722. Specifically, each successive layer may have a smaller width than each previous layer in plurality of layers 1718.

First layer 1724 has first width 1726 and first bent shape 1728. First width 1726 may be the widest of plurality of layers 1718. First bent shape 1728 may have the most acute angle of respective bent shapes 1720 of plurality of layers 1718.

Second layer 1730 may be formed on first layer 1724. Second layer 1730 has second width 1732 and second bent shape 1734. Second width 1732 may be smaller than first width 1726 of first layer 1724. Second width 1732 may be wider than the remaining of plurality of layers 1718. Second bent shape 1734 may have a wider angle than first bent shape 1728.

Third layer 1736 may be formed on second layer 1730. Third layer 1736 has third width 1738 and third bent shape 1740. Third width 1738 may be smaller than first width 1726 and second width 1732. Third bent shape 1740 may have a wider angle than second bent shape 1734.

Composite filler 1702 has cross-section 1742. Cross-section 1742 may be configured to fit within cross-section 1743 of gap 1710. In some illustrative examples, cross-section 1742 may be substantially triangular 1744. Substantially triangular 1744 cross-section 1742 has first side 1746 and second side 1748. First side 1746 of composite filler 1702 may contact composite structure 1712. In some illustrative examples, composite structure 1712 may have radius 1750. In these illustrative examples, first side 1746 of composite filler 1702 may follow radius 1750.

Second side 1748 of composite filler 1702 may contact composite structure 1714. In some illustrative examples, composite structure 1714 may have radius 1752. In these illustrative examples, second side 1748 of composite filler 1702 may follow radius 1752.

First layer 1724 may form first side 1746 of composite filler 1702 when first layer 1724 has first bent shape 1728. First layer 1724 may form second side 1748 of composite filler 1702 when first layer 1724 has first bent shape 1728.

In some illustrative examples, composite filler 1702 may also include extruded material 1754. Extruded material 1754 may be placed on the last of plurality of layers 1718. Extruded material 1754 and plurality of layers 1718 form third side 1756 of composite filler 1702. Third side 1756 may contact composite skin 1716.

Plurality of layers 1718 may be formed of composite material 1706. Composite material 1706 may take the form of tape 1755, strips 1757, or other desirable composite material. Composite material 1706 may be cut to plurality of widths 1722 using cutting machine 1708.

Composite filler 1702 may be formed from composite material 1706 using shaping equipment 1704. Shaping equipment 1704 may include base 1758 and plurality of dies 1760. First die punch 1000, second die punch 1100, third die punch 1200, fourth die punch 1300, fifth die punch 1400, and sixth die punch 1500 from FIGS. 10-15 may be physical embodiments of plurality of dies 1760. Plurality of dies 1760 has plurality of cross-sections 1762. Each of plurality of dies 1760 may be used to form a separate layer of plurality of layers 1718. Each of plurality of cross-sections 1762 may form respective bent shapes 1720 of plurality of layers 1718.

In some illustrative examples, shaping equipment 1704 may include plurality of rollers 1764 instead of plurality of dies 1760. In these illustrative examples, plurality of rollers 1764 may form respective bent shapes 1720 of plurality of layers 1718.

Composite filler 1702 may have increased pull-off strength when plurality of layers 1718 follows a radius of a composite structure. By following the radius of the composite structure, the composite filler may direct loads along the radius.

The illustration of manufacturing environment 1700 in FIG. 17 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, manufacturing environment 1700 may not include composite structure 1714. In this example, composite structure 1712 and composite skin 1716 may form gap 1710.

Illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1919. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. One or more illustrative embodiments may be used during component and subassembly manufacturing 1806. For example, composite filler 1702 in FIG. 17 may be used during component and subassembly manufacturing 1806. Further, composite filler 1702 may also be used to perform replacements during maintenance and service 1814.

The present disclosure provides a method for forming a composite filler. Layers of composite material are laid down on a forming tool. A respective bend is formed in each of the layers to form the composite filler comprising bent layers on the forming tool. The composite filler comprising the bent layers is placed into a gap formed by at least one composite structure.

The composite filler may have increased pull-off strength as compared to currently used composite fillers. In some examples, the plurality of layers may follow a radius of a composite structure. By following the radius of the composite structure, the composite filler may direct loads along the radius.

A first layer of the composite filler may form a first side and a second side of the composite filler. The first layer may contact at least one composite structure. The plurality of layers may form a third side. The third side may contact a composite skin.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   laying down a first layer of composite material on a forming tool;
   forming a bend in the first layer by pressing the first layer against the forming tool using a first die punch;
   repeating said laying down and forming steps for additional successive layers of the composite material using successively smaller die punches to form a composite filler comprising bent composite layers on the forming tool, a respective bend in each of the successive layers being formed by pressing with a respective one of the smaller punches; and
   transferring the composite filler from the forming tool into a gap formed by at least one composite structure.

2. The method of claim 1, wherein each of the successive punches has a different cross-section and a different angle forming the respective bend in a respective one of the successive layers.

3. The method of claim 1, wherein at least one of the successive layers comprises multiple plies of the composite material.

4. The method of claim 1 further comprising: adding an extruded composite material into an open space formed by the bend of the final successive layer prior to placing the composite filler into the gap.

5. The method of claim 1, wherein a cross-section of the composite filler is substantially triangular.

6. The method of claim 1, wherein each successive layer of composite material has a shorter width than a width of a previous layer of the composite material.

7. The method of claim 1, wherein the bend in each of the first and successive layers forms angled first and second layer sides parallel to first and second sides of the composite filler, respectively.

8. The method of claim 1, wherein the composite filler comprises at least the first layer having a first bent shape, a first successive layer having a second bent shape, and a second successive layer having a third bent shape.

9. The method of claim 1, wherein each of the successive die punches has a progressively smaller height than a previous of the first and successive die punches.

* * * * *